United States Patent [19]

Ito et al.

[11] 4,283,679

[45] Aug. 11, 1981

[54] ROTATIONAL DIRECTION DETECTION DEVICE FOR A MOTOR OR THE LIKE

[75] Inventors: Susmu Ito; Morimasa Nagao, both of Tokyo, Japan

[73] Assignee: Nippon Electric Co., Ltd., Tokyo, Japan

[21] Appl. No.: 31,094

[22] Filed: Apr. 18, 1979

[30] Foreign Application Priority Data

Apr. 18, 1978 [JP] Japan .................................. 53-46135

[51] Int. Cl.³ .......................... G01P 3/52; G01P 13/00
[52] U.S. Cl. .................................. 324/165; 324/174; 324/208; 340/672
[58] Field of Search .............. 324/165, 173, 207, 174, 324/208, 252; 338/12, 32 R, 32 H; 340/672

[56] References Cited

U.S. PATENT DOCUMENTS

| | | | |
|---|---|---|---|
| 3,299,702 | 1/1967 | Hulme .................................. | 324/165 |
| 3,546,579 | 12/1970 | Paul et al. ............................ | 324/252 |
| 3,559,064 | 1/1971 | Grundy ................................ | 324/173 |
| 3,636,767 | 1/1972 | Duffy .................................. | 324/174 |
| 3,835,373 | 9/1974 | Matula ................................ | 338/32 H |
| 3,900,814 | 8/1975 | Masuda .............................. | 338/32 R |
| 3,993,946 | 11/1976 | Makino .............................. | 338/32 R |
| 4,001,689 | 1/1977 | Williams et al. ...................... | 324/165 |

OTHER PUBLICATIONS

Gerald M. Walker, "Automatic Electronics Gets the Green Light," published in *Electronics*, Sep. 29, 1977, pp. 83–88.

A. B. Wills, IBM Technical Disclosure Bulletin, vol. 11, No. 1, (Jun. 1973 issue), p. 260.

*Primary Examiner*—Alfred E. Smith
*Assistant Examiner*—Thomas P. O'Hare
*Attorney, Agent, or Firm*—Sughrue, Rothwell, Mion, Zinn and Macpeak

[57] ABSTRACT

A rotational direction detection device is disclosed which has a single permanent magnet rotatable in response to the rotation of a rotary shaft. A magnetic field sensor is composed of a plurality of magnetic field detecting elements responsive to a rotating magnetic field produced by the rotation of the permanent magnet for generating an output representative of the rotation of the rotary shaft. The magnetic field detecting elements are arranged so that signals developed by at least two such elements differ in phase by a phase angle of other than 0 degree and 180 degrees. A rotary condition detector is responsive to the output of the magnetic field sensor for determining the rotational direction of the rotary shaft.

5 Claims, 34 Drawing Figures

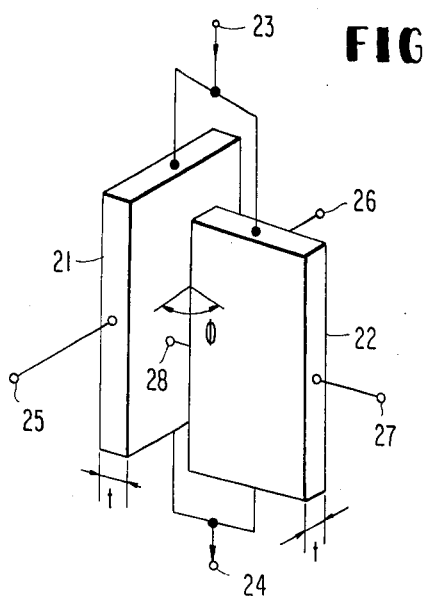
FIG 5A
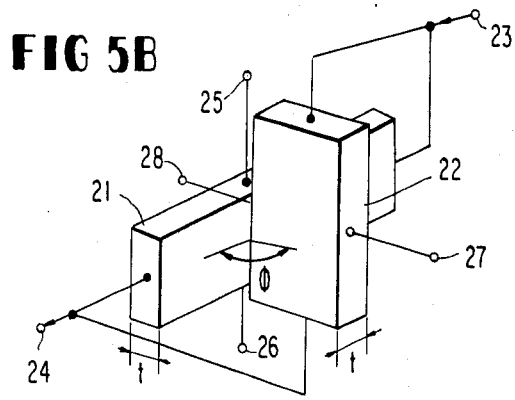
FIG 5B
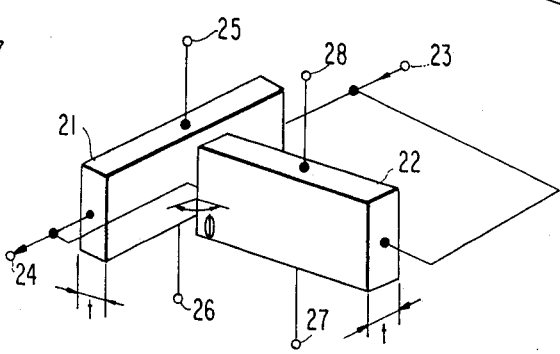
FIG 5C
FIG 6A
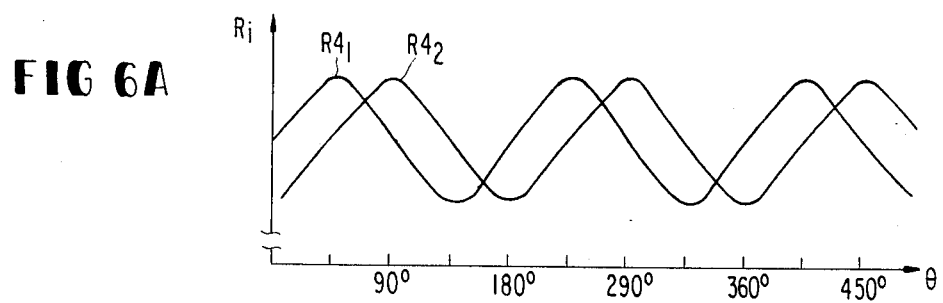
FIG 6B
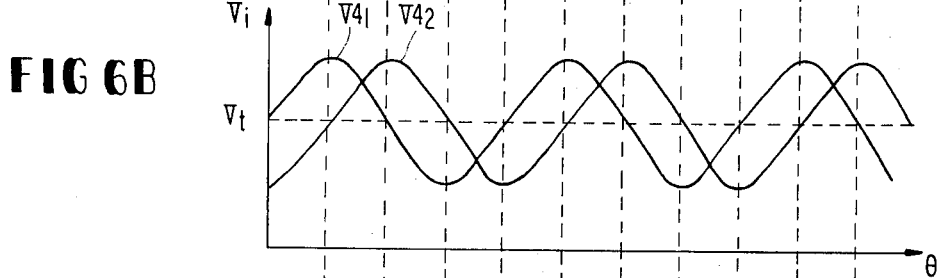
FIG 6C
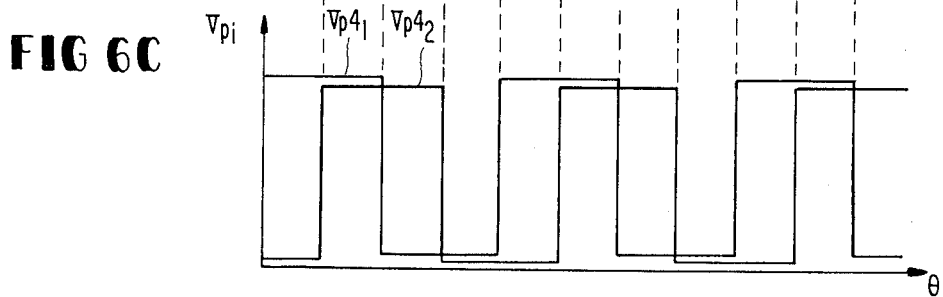

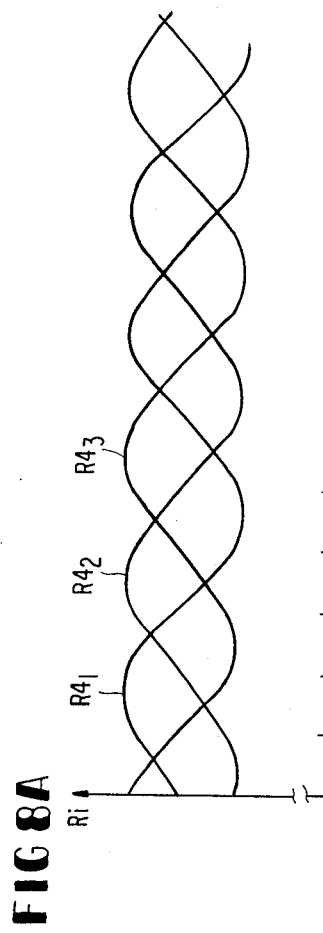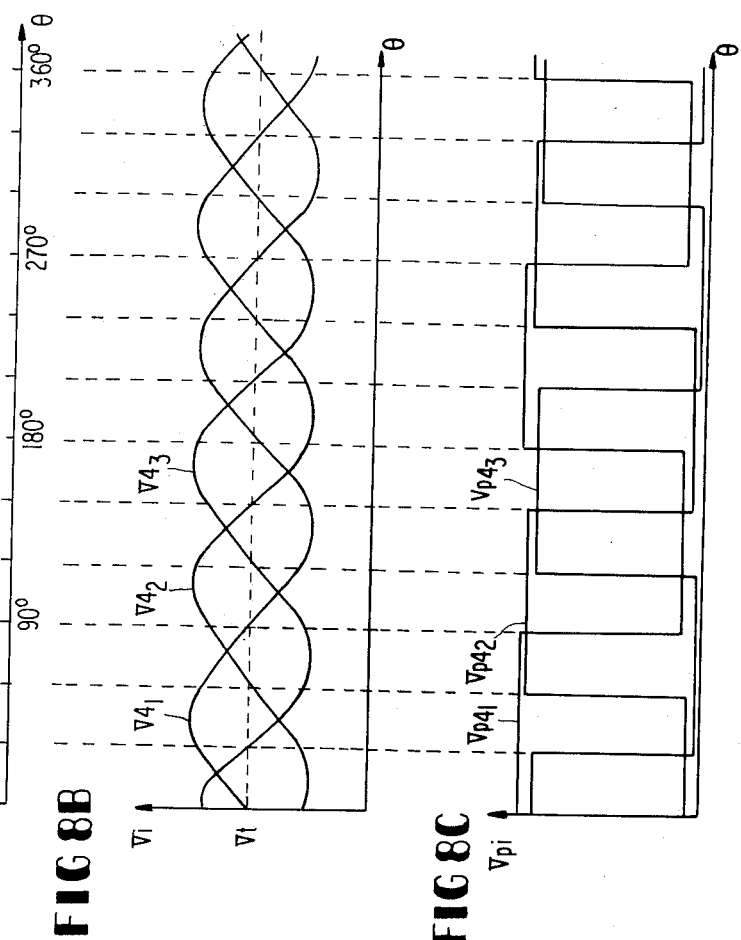
FIG 7A
FIG 8A
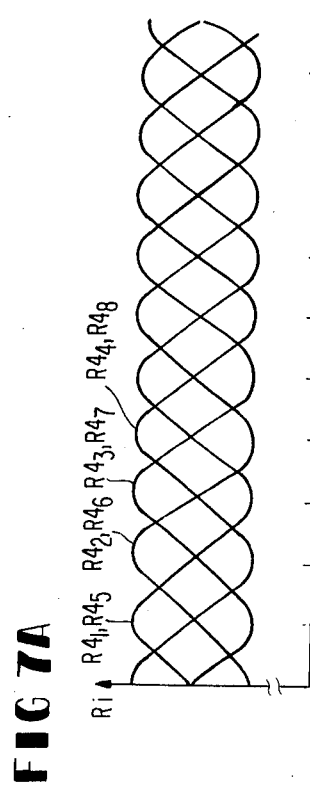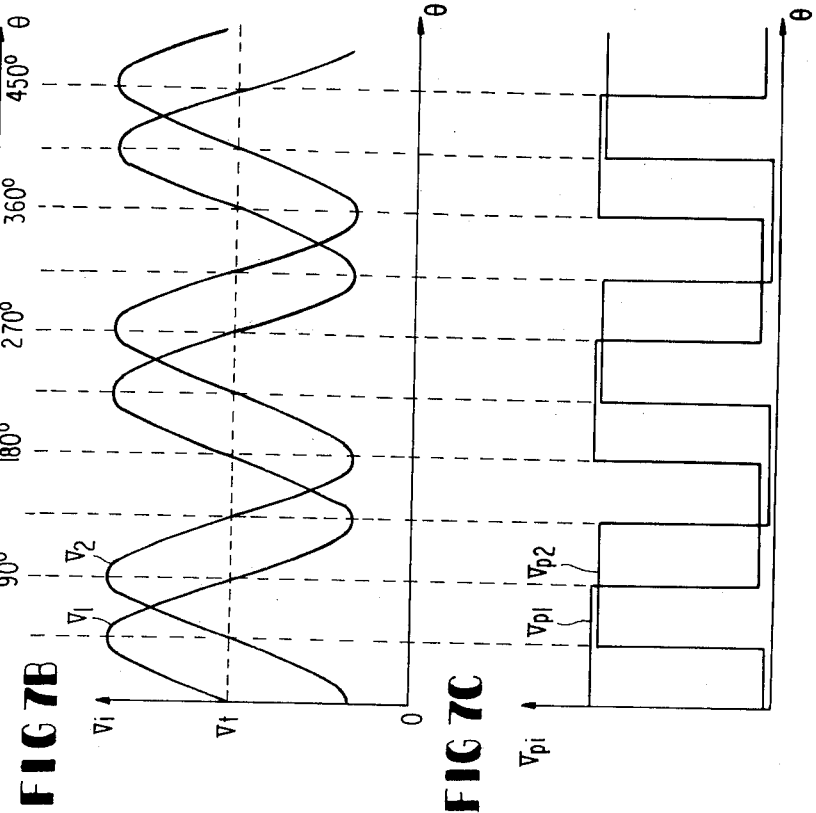
FIG 7B
FIG 7C
FIG 8B
FIG 8C

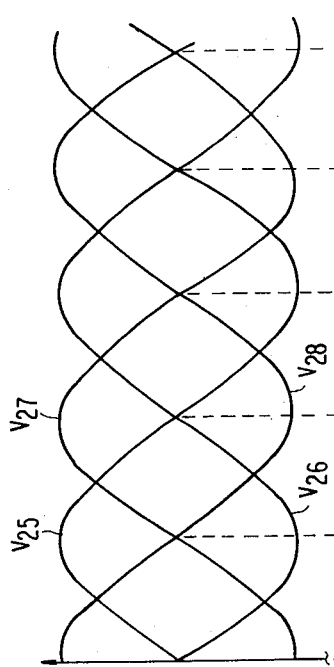
FIG 9A
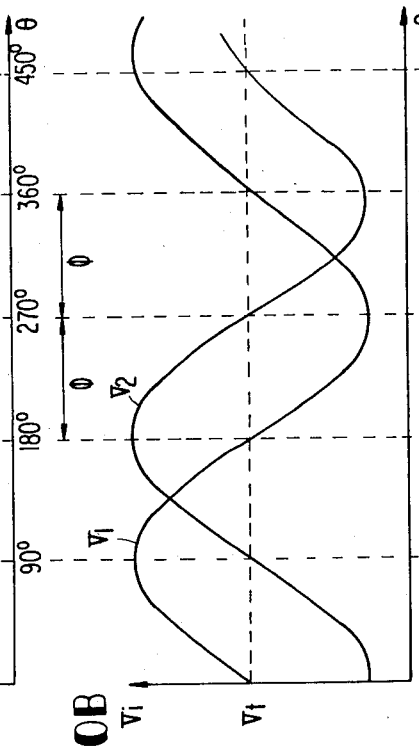
FIG 9B
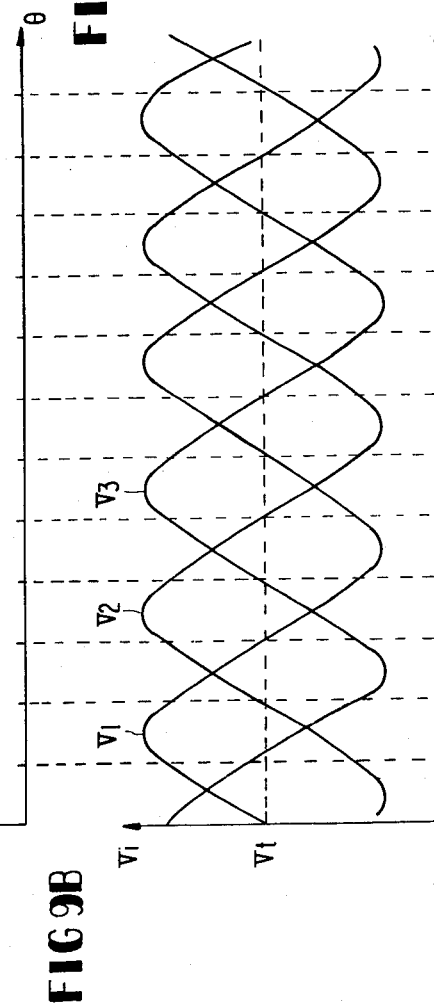
FIG 9C
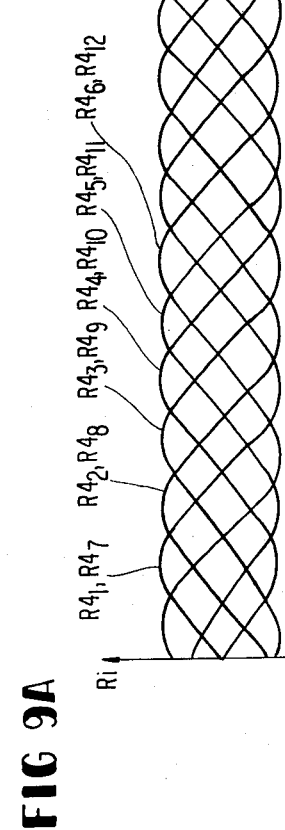
FIG 10A
FIG 10B
FIG 10C

ROTATIONAL DIRECTION DETECTION DEVICE FOR A MOTOR OR THE LIKE

This invention relates to a device for detecting the rotational direction of the rotating shaft of a motor, gear or the like.

A rotational direction detector is widely used in various fields of technology, especially for the control of precision machines, and its use is now expanding into other fields such as an automotive engine controlling system and a water flow measuring device.

The application of electronics to automobiles has made remarkable progress from the viewpoint of driving safety, fuel economy, handling ease, and the prevention of air pollution. The electronic engine control system is an example of such applications. Particularly, a microprocessor-based electronic engine control system designed to improve fuel economy and to prevent air pollution is reported in the article entitled "SPECIAL REPORT: Automotive Electronics Gets The Green Light" by Gerald M. Walker published in Electronics, September 29, 1977, pp. 83-88. The electronic engine control system (see FIG. 3 on page 86 of the Walker article) has a 12-bit microprocessor and seven engine-condition sensors. The microprocessor controls two actuators for ignition timing control and exhaust-gas recirculation. Since the state of combustion in the engine for a forward movement of the automobile differs from that for a backward movement, ignition timing and exhaust-gas recirculation have to be controlled taking such difference of the state of combustion into account. Therefore, it is indispensable that the electronic engine control system is provided with a device for detecting the direction of wheel rotation during forward and backward movements.

Such rotational direction detection is necessary also for a water flow measuring device, particularly when such device tends to suffer a reverse rotation of the shaft, which is supported to rotate only in the forward direction. A typical example of the reverse rotation occurs in the higher floors of a high-rise office or apartment building having a rooftop reservoir, particularly when the water consumption in the lower floors increases very rapidly, lowering the water pressure for the higher floors. More particularly, when water in the branching pipes installed on the upper floors is allowed to abruptly flow through the main pipe into the branching pipes on the lower floors, a reverse shaft rotation is caused at the water flow measuring device at the upper floors. Therefore, a rotational direction detection device is needed to compensate the readings of the water flow measuring device for the reverse rotation.

Several types of such rotational direction detection devices have been proposed. One example is an optical rotary encoder comprising a glass disc with a plurality of photo-slits, at least one pair of a light emitting diode (LED) and a photo diode. However, this optical encoder involves some problems: (1) it requires a highly accurate exposure technique as well as a sophisticated etching technique to provide photo-slits on the entire surface of the disc without aberration; (2) it is very difficult to accurately adjust the center of each slit and that of a bore receiving the rotating shaft; (3) it involves great difficulties to produce a bore which snugly receives the rotating shaft; (4) the encoder consequently becomes costly for achieving the intended performance, and (5) furthermore, the encoder using a glass disc is vulnerable to mechanical shock.

Another example is a magnetic tachometer as proposed by A. B. Wills in *IBM Technical Disclosure Bulletin*, Vol. 16 No. 1, (June issue, 1973), p. 260. This tachometer comprises a small-sized magnetic disk carrying a magnetic medium on one surface near its perimeter, and a magnetic flux transducer. The transducer senses magnetic signals recorded on the magnetic medium to determine the rotational speed of the disk, i.e., the rotational speed of the shaft to which the disk is connected. However, the Willis paper does not disclose a magnetic tachometer in a concrete manner but merely suggests its realizability.

SUMMARY OF THE INVENTION

An object of this invention is therefore to provide a compact, light-weight rotational direction detection device, which is free from the above-described disadvantages of the conventional devices.

According to an aspect of this invention, there is provided a device comprising a permanent magnet which rotates in response to the motion of the rotating shaft of a rotating object; a magnetic field sensor having a plurality of magnetic field detecting elements responsive to a rotating magnetic field produced by the rotation of said permanent magnet for generating an output representative of the rotation of said rotary shaft, at least two of said elements being arranged to form an angle different from 0 degree, 90 degrees, 180 degrees and 270 degrees; and a rotaty condition detector for determining the rotational direction of said rotating shaft responsive to the output of said magnetic field sensor.

BRIEF DESCRIPTION OF THE DRAWINGS

This and other objects, features and advantages of this invention will be fully understood by the following detailed description taken in conjunction with the accompanying drawings, wherein:

FIGS. 5A to 5C illustrate typical examples of the arrangement of Hall effect devices for use in the invention;

FIGS. 6A to 6C, through FIGS. 10A to 10C and FIGS. 12A to 12D are waveforms for illustrating the operation of the present device.

Throughout the entire drawing, like reference numerals represent like elements.

DESCRIPTION OF THE PREFERRED EMBODIMENT

Figure 1A:
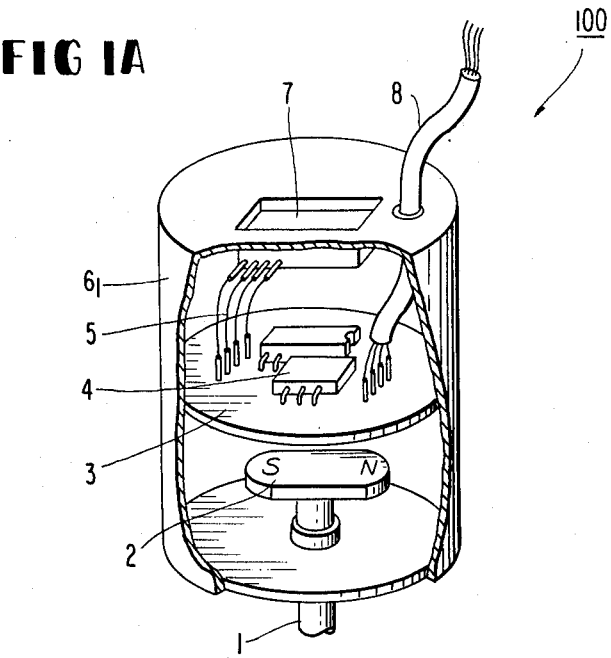
FIGS. 1A and B are perspective views showing the exterior of the detection device according to this invention.

Referring now to FIG. 1A, a rotational direction detection device 100 of this invention comprises a permanent magnet 2 coupled to a rotating shaft 1 of a rotary object, whose rotating direction is to be detected; a magnetic field sensor 4 responsive to a rotating magnetic field produced by the rotation of the permanent magnet 2 for generating an output representative of the electrical resistance change corresponding to the rotation of the rotary shaft 1; rotary condition detector 5 for determining the rotational direction of the magnet 2 in response to the output of the sensor 4; a display circuit 7 for displaying the result of determination made by the detector 5; a printed circuit board 3 on which the sensor 4 and the detector 5 are arranged; and a casing $6_1$ for housing the printed circuit board 3, sensor 4, detector 5 and magnet 2. A light-emitting diode or a liquid-crystal display panel may be used as the display circuit 7. A cable 8 serves to supply power to the sensor 4, detector 5 and display circuit 7 as well as to receive the output of the detector 5.

Figure 1B:
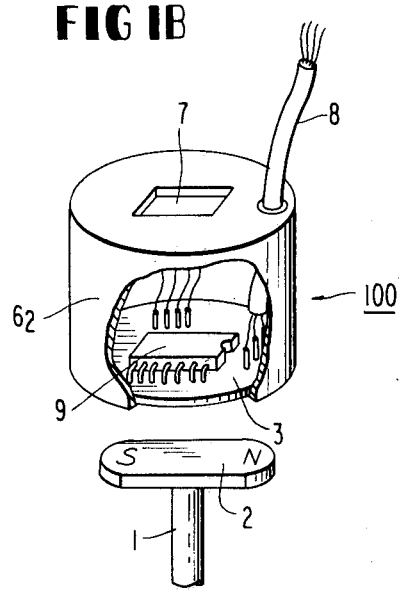

FIG. 1B shows another device 100 of the invention which is the same as that shown in FIG. 1A except that both the detector 5 and sensor 4 are integrated into a sensor rotary condition detector 9 and that the magnet 2 is provided on the outside of a casing $6_2$.

Figure 2:
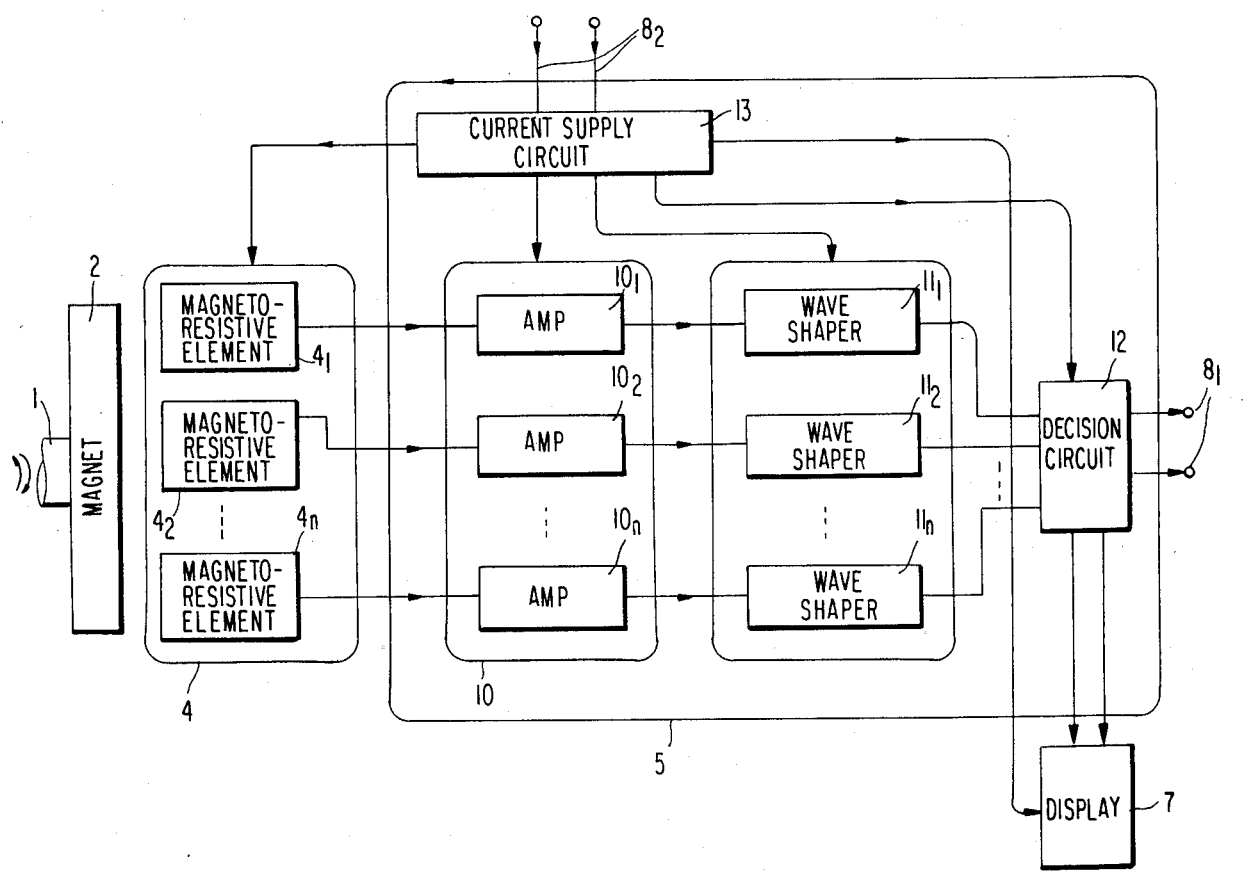
FIG. 2 is a block diagram showing one embodiment of this invention.

Referring to FIG. 2, one embodiment of this invention comprises the permanent magnet 2 fixed to the rotating shaft 1 of a rotating object; the magnetic field sensor 4 having a plurality of magnetic field detecting elements made of magnetoresistive elements (MR elements) $4_1, 4_2 \ldots, 4_n$ responsive to rotating magnetic field produced by the rotation of the permanent magnet 2 for generating the output representative of the electrical resistance change corresponding to the rotation of the rotary shaft 1, at least two of said MR elements being so arranged that their output electrical resistance changes differ in phase from each other with respect to the magnetic field; an amplifier circuit 10 composed of amplifiers $10_1, 10_2, \ldots, 10_n$ for amplifying the outputs of the sensor 4 to a predetermined voltage level; a wave-shaping unit 11 including wave-shaping circuits $11_1, 11_2, \ldots, 11_n$ for converting the output signal from the amplifier circuit 10 into a pulse signal; a decision circuit 12 for determining the rotational direction of the magnet 2 based on the output of the shaping unit 11 and for delivering the detected rotational direction as an electrical signal to insulated conductors $8_1$ forming a cable 8 (FIG. 1); a display circuit 7 for displaying the result of determination made by the decision circuit 12; and a current supply circuit 13. The output of the decision circuit 12 is supplied as information for system control by a microprocessor used in an automotive engine control system as described hereinbefore, and as a control signal for correcting the water flow meter reading previously discussed.

Referring again to FIG. 2, the current supply circuit 13, together with the amplifier circuit 10, the wave-shaping unit 11 and the decision circuit 12, forms the rotary condition detector 5. An external power supply source (not shown) is connected to each circuit of FIG. 2 through insulated conductors $8_2$ of the cable 8. The current supply circuit need not be provided if said power supply source is stable in operation, but generally, the circuit 13 is added to assure a stable output from the sensor 4.

Figure 3:
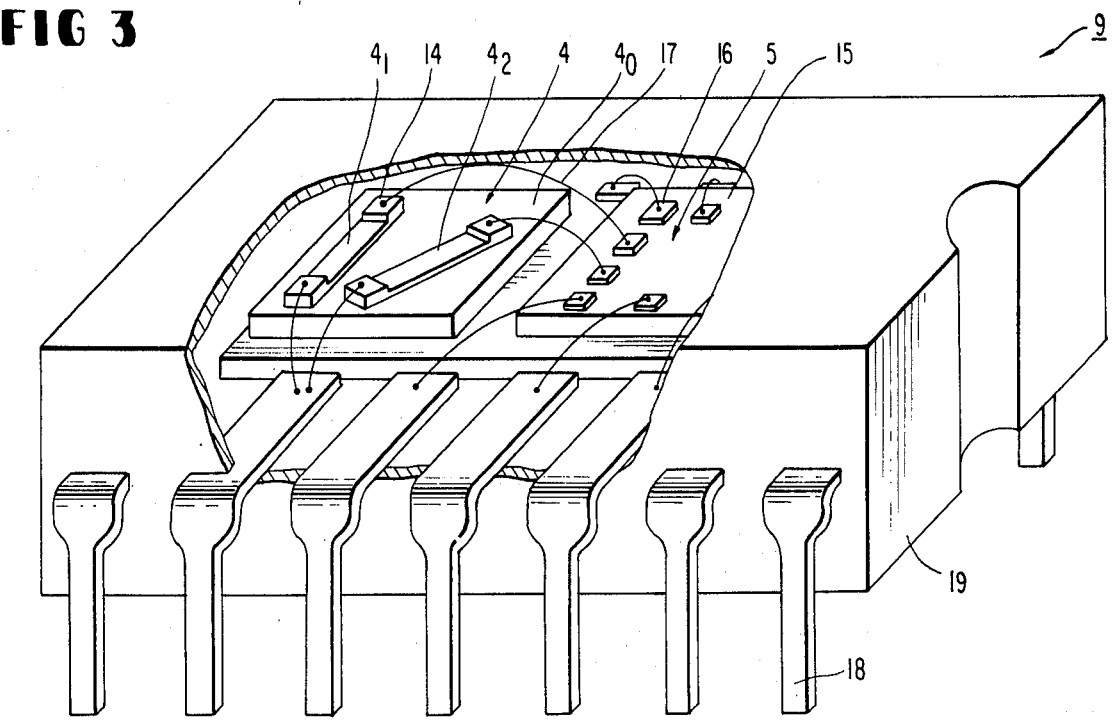
FIG. 3 is a perspective view showing in detail a part of one embodiment of the invention.

Referring to FIG. 3 which shows in detail the sensor-rotary condition detector 9 shown in FIG. 1B, the sensor 4 is comprised of magnetic field detecting elements $4_1$ and $4_2$ (each of which is made of a ferromagnetic magnetoresistive element as will be described hereinafter) formed on a substrate $4_0$ and conductor terminals 14 provided on both ends of each of the elements $4_1$ and $4_2$. The sensor 4 is wire-bonded by conductor wires 17 with the rotary condition detector 5 having conductor terminals 16 formed onto a silicon single crystal substrate 15. These terminals 14 and 16 are further wire-bonded with leads 18. The sensor 4 and the detector 5 are integrally molded by the use of resin.

On the other hand, the sensor 4 and the detector 5 shown in FIG. 1A are molded separately on the substrates $4_0$ and 15 of FIG. 3 with the use of resin.

Figure 4A:
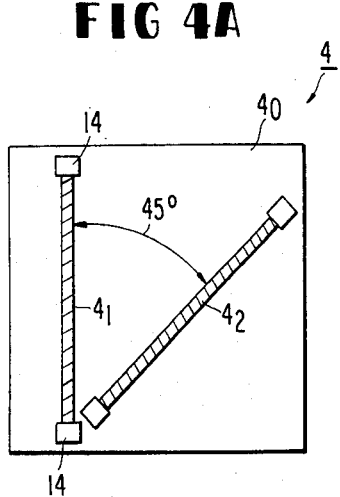
FIGS. 4A to 4D illustrate typical examples of the arrangement of magnetoresistors for use in the invention.

Referring to FIG. 4A, the magnetic field sensor 4 includes a substrate $4_0$ such as a glass plate or silicon single crystal substrate with a smooth surface and ferromagnetic magnetoresistors (FMR) $4_1$ and $4_2$ formed onto the substrate $4_0$, each of said FMRs having the conductor terminals 14 on both ends thereof. The terminals 14 are made of a thin film of gold, aluminum, copper or other metal suitable for providing a sense current to the FMRs $4_1$ and $4_2$. Each of the FMRs $4_1$ and $4_2$ is formed of a thin film made of a metal such as nickel, iron and cobalt or alloy chiefly containing such metals. The two FMRs $4_1$ and $4_2$ are so arranged that the sense currents appearing at their respective terminals 14 form an angle that differs from 0 degree, 90 degrees, 180 degrees and 270 degrees. In FIG. 4A, the angle is shown to be at 45 degrees. It is known that an electrical resistance R of such FMRs assumes a minimum value when the angle $\Phi$ formed by the direction of its magnetization and that of a sense current which is produced therein for measurement of the electrical resistance R is 90 degrees or 270 degrees. Whereas the resistance R assumes a maximum value ($R_0$) when the angle $\Phi$ is 0 degree or 180 degrees, as expressed by the following relationship:

$$R(\Phi) = R_0 - \Delta R \sin^2\Phi \quad (1)$$

The direction of magnetization of the FMR is parallel to that of an external magnetic field when the strength of the field exceeds a certain value $H_t$. With this invention, the permanent magnet 2 is so designed that it produces the magnetic field which exceeds said value $H_t$ at the location of the magnetic field sensor. The present inventors have experimentally confirmed that an external magnetic field of 30 oersteds is needed because the direction of magnetization of the FMR $4_1$ or $4_2$ becomes parallel to that of the external magnetic field when the FMR $4_1$ and $4_2$ are made of an Fe(18%) and Ni(82%) alloy having a width of 20 microns ($\mu$), a thickness of $0.05\mu$ and a length of 1 mm.

Each of the FMRs has an electrical resistance ($R_0$) of about 250 ohms, providing a resistance change ratio $\Delta R/R_0$ of about 2.5%. Though the resistance $R_0$ and the resistance change ratio $\Delta R/R_0$ vary depending upon the composition of an FMR, the latter is within the range from about 1 to 5% in practically every case.

In the arrangement illustrated in FIG. 4A, since the sense currents flowing through the FMRs $4_1$ and $4_2$ are slanted from each other by 45 degrees, electrical resistance $R4_1$ of the FMR $4_1$ measured at the terminals 14 at the both ends is 45 degrees out of phase with electrical resistance $R4_2$ of the FMR $4_2$ as illustrated in FIG. 6A, with the rotational angle of the permanent magnet 2 depicted as $\theta$ (counterclockwise rotation being hereunder referred to as rotation for the forward direction).

Figure 4B:
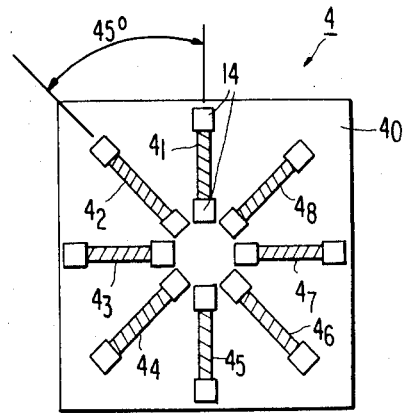
Figure 4C:
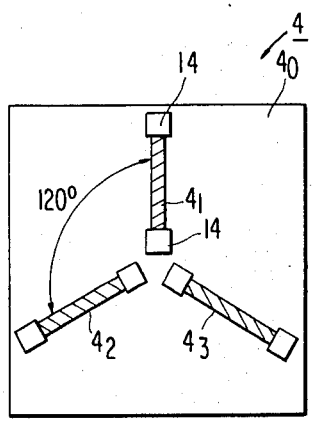
Figure 4D:
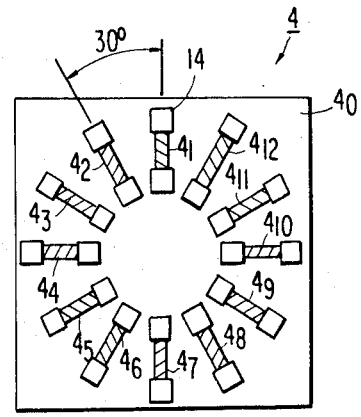

FIGS. 4B to 4D illustrate other arrangements of the FMRs used in the magnetic field sensor 4. In FIG. 4B, eight FMRs $4_1$ through $4_8$ are arranged to form an angle of 45 degrees between every two FMRs. In FIG. 4C, three FMRs $4_1$ to $4_3$ are arranged to form an angle of 120 degrees between two adjacent FMRs. In FIG. 4D, twelve FMRs $4_1$ through $4_{12}$ are arranged to form an angle of 30 degrees between two adjacent FMRs. In the sensor 4 of FIG. 4B, there is a phase difference of 45 degrees between resistance changes of two adjacent FMRs as shown in FIG. 7A. Similarly, in FIGS. 4C and 4D, there are phase differences of 120 degrees and 30 degrees between resistance changes of two adjacent FMRs as shown in FIGS. 8A and 9A, respectively.

Figure 11A:
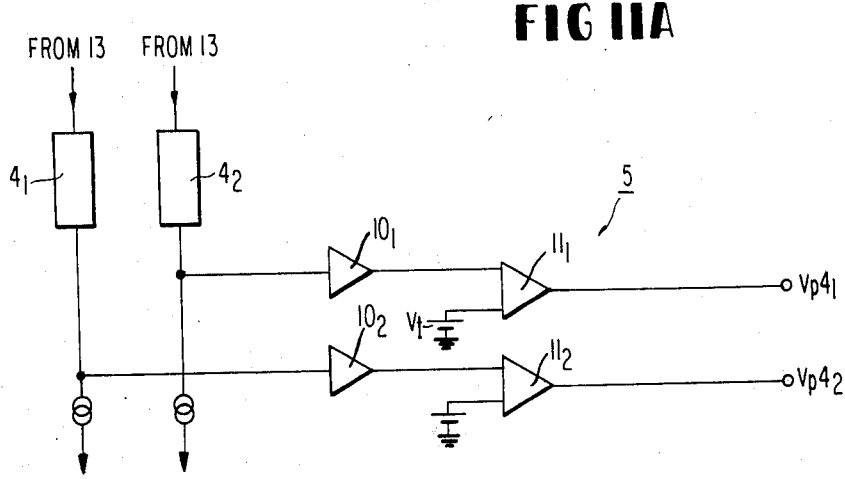
FIGS. 11A to 11C and FIG. 13 are block diagrams showing in detail another part of the embodiment of the invention.
Figure 11B:
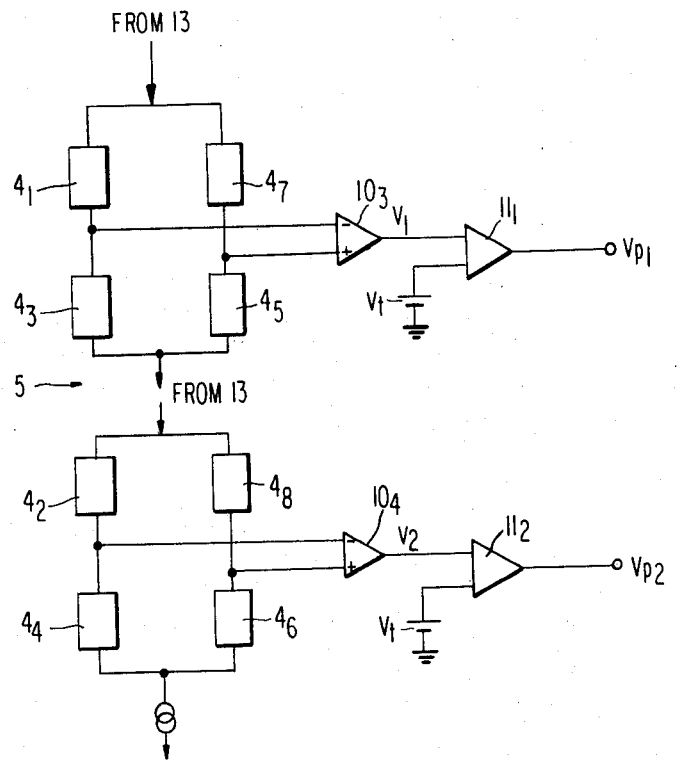
Figure 11C:
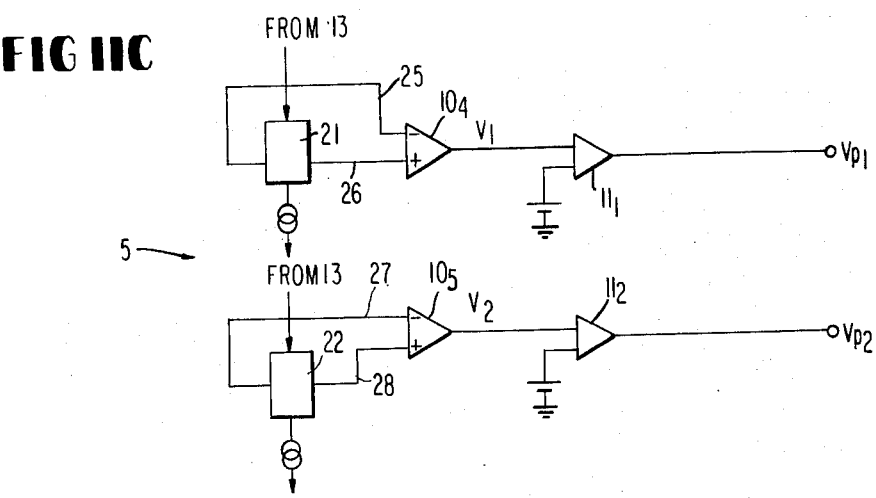

FIGS. 11A to 11C show specific circuit diagrams of the rotary condition detector 5 for converting such a resistance change of each FMR into a voltage change. Referring first to FIG. 11A, the resistance changes (R41 and R42) of the FMRs $4_1$ and $4_2$ of FIG. 4A are converted into voltage changes $V4_1$ and $V4_2$ by supplying a constant current to the FMRs $4_1$ and $4_2$ from the current supply circuit 13 (FIG. 2) as shown in FIG. 6B. The voltage changes $V4_1$ and $V4_2$ are amplified by amplifiers $10_1$ and $10_2$, and converted into pulse signals $Vp4_1$ and $Vp4_2$ by comparators $11_1$ and $11_2$ with a threshold voltage level $V_t$ set at the center of the voltage changes $V4_1$ and $V4_2$. As a result, pulse trains $Vp4_1$ and $Vp4_2$ are produced as shown in FIG. 6C with a phase difference of 45 degrees.

For the magnetic field sensor shown in FIG. 4C, the resistance changes of the FMRs $4_1$ to $4_3$ can be converted into the voltage changes by adding to the circuit of FIG. 11A an amplifier of the same type as the amplifier $10_1$ of FIG. 11A and a comparator of the same type as the comparator of FIG. 11A.

In this case, the outputs $V4_1$ to $V4_3$ from the amplifiers and the outputs $Vp4_1$ to $Vp4_3$ from the comparators are illustrated in FIGS. 8B and 8C.

Also, bridge circuits as shown in FIG. 11B is used for the arrangements illustrated in FIG. 4B or 4D each of which includes a number of FMRs and provides outputs with the same phase and those with the reverse phase as shown as resistance changes $R4_1$ to $R4_8$ in FIG. 7A.

If the sensor of the type shown in FIG. 4B is used, the output voltage of the bridge circuit composed of the FMRs $4_1$, $4_3$, $4_7$ and $4_5$ and that of the bridge circuit composed of the FMRs $4_2$, $4_4$, $4_8$ and $4_6$ are amplified by differential amplifiers $10_3$ and $10_4$ so that output voltage V1 and V2 are doubled, reducing the phase distortion noise. With the threshold voltage level Vt set at the center of the outputs V1 and V2 of the differential amplifiers $10_3$ and $10_4$, pulse trains $Vp_1$ and $Vp_2$ illustrated in FIG. 7C are produced. Similarly, if the sensor of the type shown in FIG. 4D is used, the outputs V1, V2 and V3 of the bridge circuits (FMRs $4_1$, $4_4$, $4_{10}$ and $4_7$), (FMRs $4_2$, $4_5$, $4_{11}$ and $4_8$), and (FMRs $4_3$, $4_6$, $4_{12}$ and $4_9$), respectively, are amplified by respective differential amplifiers (as shown in FIG. 9B), and the outputs from the amplifiers are converted into pulse signals to produce pulse trains $Vp_1$, $Vp_2$ and $Vp_3$ shown in FIG. 9C.

In place of the FMRs, semiconductor magnetoresistors (SMRs) of the same shape as indicated in FIGS. 4A to 4D may also be used as magnetic field detecting elements for use in the magnetic field sensor. In this case, the sensor can be formed by a substrate (such as a glass plate or a silicon single crystalline chip) with a smooth surface and SMRs each of which is formed on the substrate and has a thickness of a few-microns and a width of serval tens of microns, and ohmic electrodes used as sense current deriving terminals. The SMR is made of a high-purity n-type semiconductor of germanium, indium antimonide, indium arsenide, gallium arsenide and other compounds. The SMR has such a characteristic that its electrical resistance increases in proportion to the square ($H^2$) of the magnitude of the external magnetic field when the sense current is perpendicular to the external magnetic field, whereas its resistance undergoes no substantial change when the magnetic field and sence current are parallel to each other. It is to be appreciated that the permanent magnet 2 produces a magnetic field of 100 oersteds or more at the location of an SMR.

Referring to FIGS. 5A to 5C each of which shows the magnetic field sensor 4 using Hall effect devices 21 and 22, each of the devices 21 and 22 has a thickness of a few to several tens of microns and a width of several tens to several thousands of microns and is made of an n-type semiconductor of silicon, germanium, indium antimonide, indium arsenide, gallium arsenide or the like. The devices are also arranged so that the plane of one device is slanted by an angle $\phi$ (about 90 degrees) with respect to that of the other device. Hall voltages are produced between leads 25 and 26 and between leads 27 and 28 which are connected to Hall electrodes, in response to currents flowing through leads 23 and 24 connected to ohmic electrodes disposed on the respective devices 21 and 22. The Hall voltages vary with the magnetic field components perpendicular to the plane of each device. The voltage appearing across the leads 25 and 26 is different by 180 degrees in phase from that across the lead 27 and 28. However, since the plane of the Hall effect device 21 is slanted by the angle $\phi$ (90 degrees) with respect to that of the device 22, the leads 25 to 28 produce their respective voltages $V_{25}$ to $V_{28}$ which differ by 90 degrees in phase from one another as shown in FIG. 10A. The outputs appearing across the leads 25 and 26 as well as 27 and 28 are amplified by differential amplifiers $10_4$ and $10_5$ shown in the detector circuit of FIG. 11C to produce voltages $V_1$ and $V_2$ shown in FIG. 10B. These output voltages $V_1$ and $V_2$ are then converted into pulse signals by comparators $11_1$ and $11_2$ so that pulse trains $Vp_1$ and $Vp_2$ shown in FIG. 10C may be produced. The output from the wave-shaping unit 11 of FIG. 2 is delivered in the form of pulse trains having a selected phase difference as described hereinbefore. The pulse trains are then applied to the decision circuit 12 to detect the phase difference in the pulse trains, thereby determining the rotational direction of the permanent magnet 2. The operational principle of the decision circuit 12 is now described by reference to the pulse trains shown in FIGS. 12A to D and FIGS. 4B and 4D.

Figure 12A:
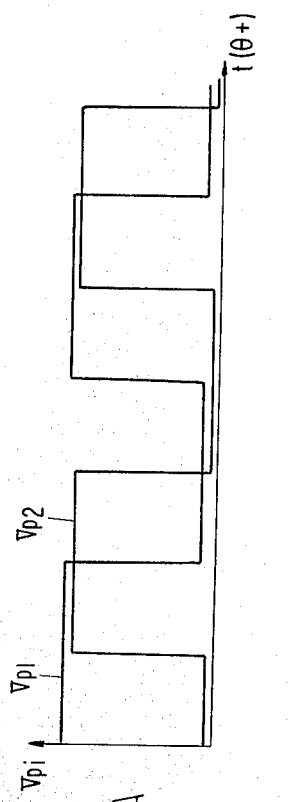
Figure 12B:
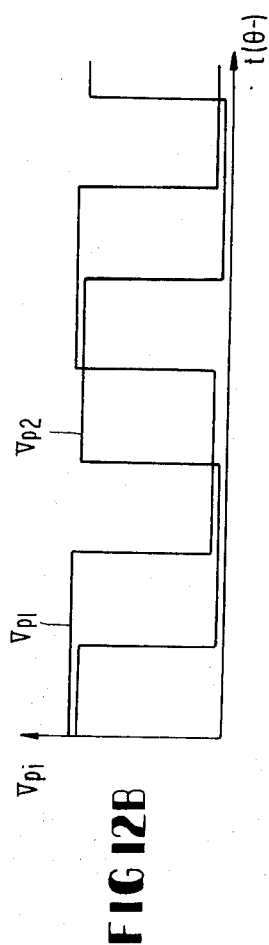

FIG. 12A shows pulse trains $Vp_1$ and $Vp_2$ produced using the sensor 4 of FIG. 4B when the permanent magnet 2 rotates in the forward direction with time t to rotate the magnetic field applied to each FMR counterclockwise, whereas FIG. 12B shows pulse trains produced as a result of the reverse rotation of the magnet 2. At the high to low changing point of the pulse train $Vp_1$, the pulse train $Vp_2$ of FIG. 12A has a high level, whereas the pulse train $Vp_2$ of FIG. 12B has a low level. Stated conversely, at the low-to-high changing point of the pulse train $Vp_1$, the train $Vp_2$ of FIG. 12A has a low level and the train $Vp_2$ of FIG. 12B has a high level.

Figure 12C:
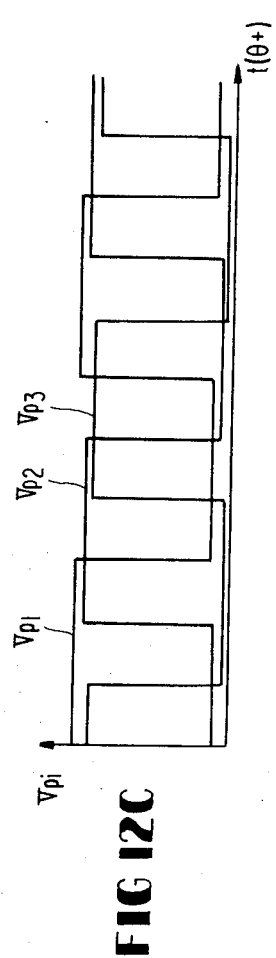
Figure 12D:
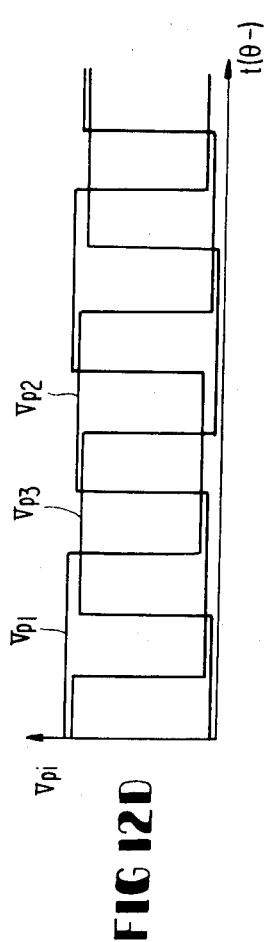

FIGS. 12C and 12D show pulse trains $Vp_1$, $Vp_2$ and $Vp_3$ produced using the sensor 4 of FIG. 4D when the magnet 2 rotates in the forward and reverse directions, respectively. More clearly, at the falling points (rising points) of the pulse train $Vp_1$, the pulse trains $Vp_2$ and $Vp_3$ are at high (low) and low (high) levels, respectively, upon the rotation in the forward direction, whereas upon the rotation in the reverse direction, the pulse trains $V_{p2}$ and $V_{p3}$ are at low (high) and high (low) levels. Similarly, the waveforms shown in FIG. 6C, FIG. 8C and FIG. 10C can also be used to detect the rotational direction of the permanent magnet 2. Therefore, the rotational direction of the permanent magnet 2 can be detected from at least two pulse trains having a selected phase difference by determining the level of one pulse train at the falling point (rising point) of the other pulse train. To this end, it is essential that two pulse trains are produced with phases different from each other. However, the intended determination of the pulse levels in impossible if the two pulse trains have a phase difference with each other wherein the falling or rising point of one pulse train coincides with the rising or falling point of the other. To avoid such difficulties, at least two of the FMRs or SMRs must be arranged such that sense currents flowing through them form an angle other than 0 degree, 90 degrees, 180 degrees and 270 degrees, and at least two Hall effect devices must be arranged such that the plane of each device is slanted from the plane of the other at an angle other than 0 degree or 180 degrees.

While, for the simplicity of description and drawings, the sense currents are shown to flow through every two adjacent FMRs at the same angle with respect to each other in FIGS. 4B, 4C and 4D as well as the two Hall effect devices are shown to slant with each other to form the same angle on their respective planes, other arrangements of FMRs, SMRs and Hall effect devices may be employed so long as the above described requirements are met.

Figure 13:
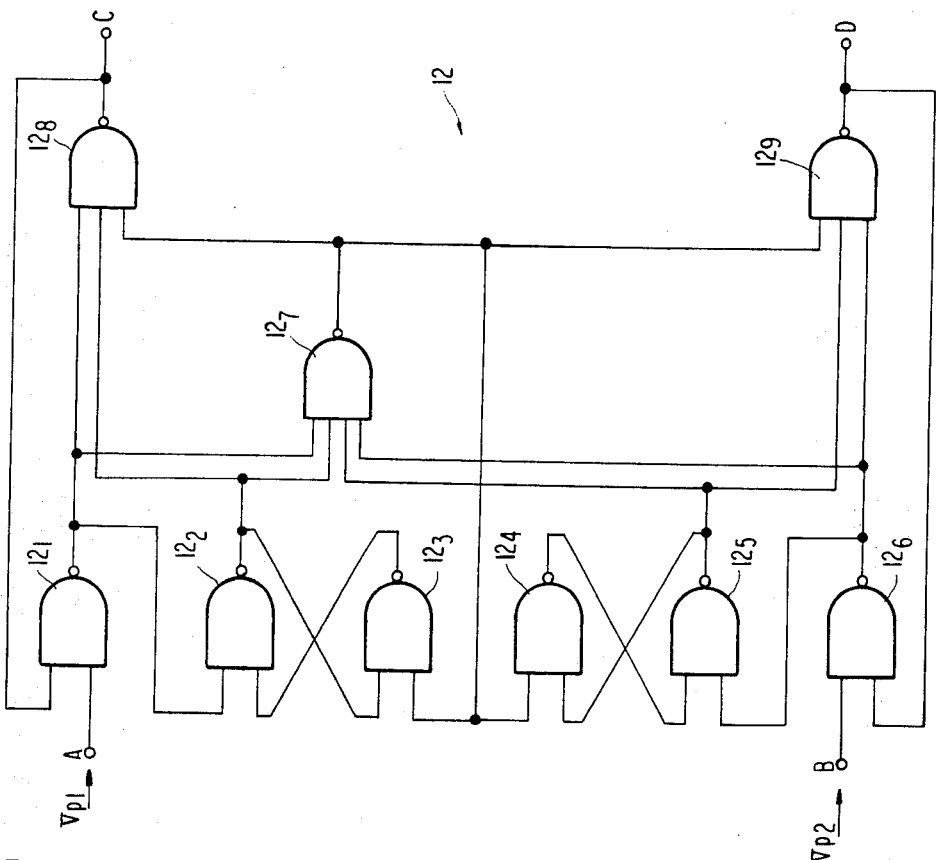

Referring to FIG. 13, the decision circuit 12 suitable for determining the levels of pulse trains shown in FIGS. 12A and 12B, comprise NAND gates $12_1$ through $12_9$. With the pulse train $V_{p1}$ applied to terminal A and the pulse train $V_{p2}$ applied to a terminal B, if a high-to-low transition occurs in the pulse train $V_{p1}$ when the pulse train $V_{p2}$ is at a high level, terminals C and D remain at low and high levels, respectively, until the high-to-low transition occurs in the pulse train $V_{p2}$. Whereas if a high-to-low transition occurs in the pulse train $V_{p1}$ when the pulse train $V_{p2}$ is at the low level, the terminals C and D remain at high and low levels, respectively, until the low-to-high transition occurs in the pulse train $V_{p2}$. Simply stated, the rotational direction of the magnet is determined by a change of a combination of the levels produced at the terminals C and D. Since the device of the present invention enables the detection of the rotational direction of the permanent magnet at the falling points (rising points) of the pulses, the detection can be made without consideration of a pulse rate, namely, the rotational speed of the permanent magnet. It is to be noted that the FMRs, SMRs and Hall effect devices used in this invention have frequency characteristics such that they can respond to the frequency range from zero (DC) to a few magahertz or more, permitting their application to a wide variety of rotating objects including those operating at very low speeds as well as those operating at super high speeds.

As has been described above, this invention enables easy detection of the rotational direction of a rotary shaft using a very simplified device, responsive to a very wide range of frequency bands. Also, though invention has been described by reference to the preferred materials, shapes and arrangements of circuit components, they are by no means intended to limit the scope of this invention.

What we claim is:

1. A rotational direction detection device comprising a single permanent magnet rotatable in response to the rotation of a rotary shaft of a rotary object for generating a rotating magnetic field in a first plane substantially perpendicular to the rotary shaft; a magnetic field sensor disposed in a second plane parallel to and adjacent said first plane and spaced from said shaft, and having a plurality of ferromagnetic magnetoresistive elements lying in said second plane so as to be responsive to said rotating magnetic field for generating an output representative of the rotation of said rotary shaft, at least two of said elements being arranged within said second plane to form an angle other than 0 degree, 90 degrees, 180 degrees and 270 degrees; and a rotary condition detector responsive to the output of said magnetic field sensor for determining the rotational direction of said rotary shaft.

2. A rotational direction detection device as claimed in claim 1 wherein there are two magnetic field detecting elements arranged to form an angle of 45 degrees in said second plane.

3. A rotational direction detection device as claimed in claim 1 wherein there are eight magnetic field detecting elements arranged to form an angle of 45 degrees between each adjacent pair of elements in said second plane.

4. A rotational direction detection device as claimed in claim 1 wherein there are three magnetic field detecting elements arranged to form angles of 120 degrees between adjacent elements in said second plane.

5. A rotational direction detection device as claimed in claim 1 wherein there are twelve magnetic field detecting elements arranged to form an angle of 30 degrees between each adjacent pair of elements in said second plane.

* * * * *